(12) United States Patent
Zhang et al.

(10) Patent No.: US 10,937,121 B2
(45) Date of Patent: Mar. 2, 2021

(54) MEMORY MANAGEMENT FOR COMPLEX IMAGE ANALYSIS

(71) Applicant: INTERNATIONAL BUSINESS MACHINES CORPORATION, Armonk, NY (US)

(72) Inventors: Rui Zhang, San Francisco, CA (US); Subashini Balachandran, Sunnyvale, CA (US); Lukas Rupprecht, San Jose, CA (US); Hongzhi Wang, Santa Clara, CA (US); Renu Tewari, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 16/198,934

(22) Filed: Nov. 23, 2018

(65) Prior Publication Data

US 2020/0167891 A1  May 28, 2020

(51) Int. Cl.
*G06F 9/455* (2018.01)
*G06T 1/60* (2006.01)

(52) U.S. Cl.
CPC ...................................... *G06T 1/60* (2013.01)

(58) Field of Classification Search
None
See application file for complete search history.

(56) References Cited

U.S. PATENT DOCUMENTS

| 7,065,624 | B1 | 6/2006 | Zahavi |
| 7,589,736 | B1 | 9/2009 | West |
| 7,728,842 | B2 | 6/2010 | Honmi |
| 9,021,200 | B1 | 4/2015 | Kushmerick |
| 2013/0311742 | A1 | 11/2013 | Ding et al. |
| 2016/0306555 | A1 | 10/2016 | Banerjee et al. |
| 2017/0017511 | A1 | 1/2017 | Papuzzo et al. |

OTHER PUBLICATIONS

"Dependent and independent variables" From Wikipedia Sep. 11, 2017 (5 Pages).

*Primary Examiner* — Gregory A Kessler
(74) *Attorney, Agent, or Firm* — Griffiths & Seaton PLLC

(57) ABSTRACT

Various embodiments are provided for managing memory for image analysis in a computing environment by a processor. An estimated amount of memory may be reserved for an image analysis job. During a processing of the image analysis job, at least one thread of the image analysis job is partially suspended by restricting the image analysis job from requesting allocation of additional memory upon memory requirements for the image analysis job exceeding the estimated amount of memory. Commensurate with partially suspending the at least one thread, a state of the image analysis job is maintained in the memory notwithstanding the processing of the at least one thread associated with the state is suspended.

15 Claims, 10 Drawing Sheets

MEMORY MANAGEMENT FOR COMPLEX IMAGE ANALYSIS

BACKGROUND OF THE INVENTION

Field of the Invention

The present invention relates in general to computing systems, and more particularly to, various embodiments for managing memory for complex image analysis in a computing environment by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence that is employed to allow computers to evolve behaviors based on empirical data.

SUMMARY OF THE INVENTION

Various embodiments for managing memory for complex image analysis by a processor, are provided. In one embodiment, by way of example only, a method for managing memory for image analysis in a computing environment, again by a processor, is provided. An estimated amount of memory may be reserved for an image analysis job. During a processing of the image analysis job, at least one thread of the image analysis job is partially suspended by restricting the image analysis job from requesting allocation of additional memory upon memory requirements for the image analysis job exceeding the estimated amount of memory. Commensurate with partially suspending the at least one thread, a state of the image analysis job is maintained in the memory notwithstanding the processing of the at least one thread associated with the state is suspended. An upper bound of the estimated amount of memory may be estimated/predicted using a linear regression model with image resolution as an independent variable and a prediction interval. The linear regression model may be trained using a target function that penalizes under estimation of the estimated amount of memory as compared to over estimation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
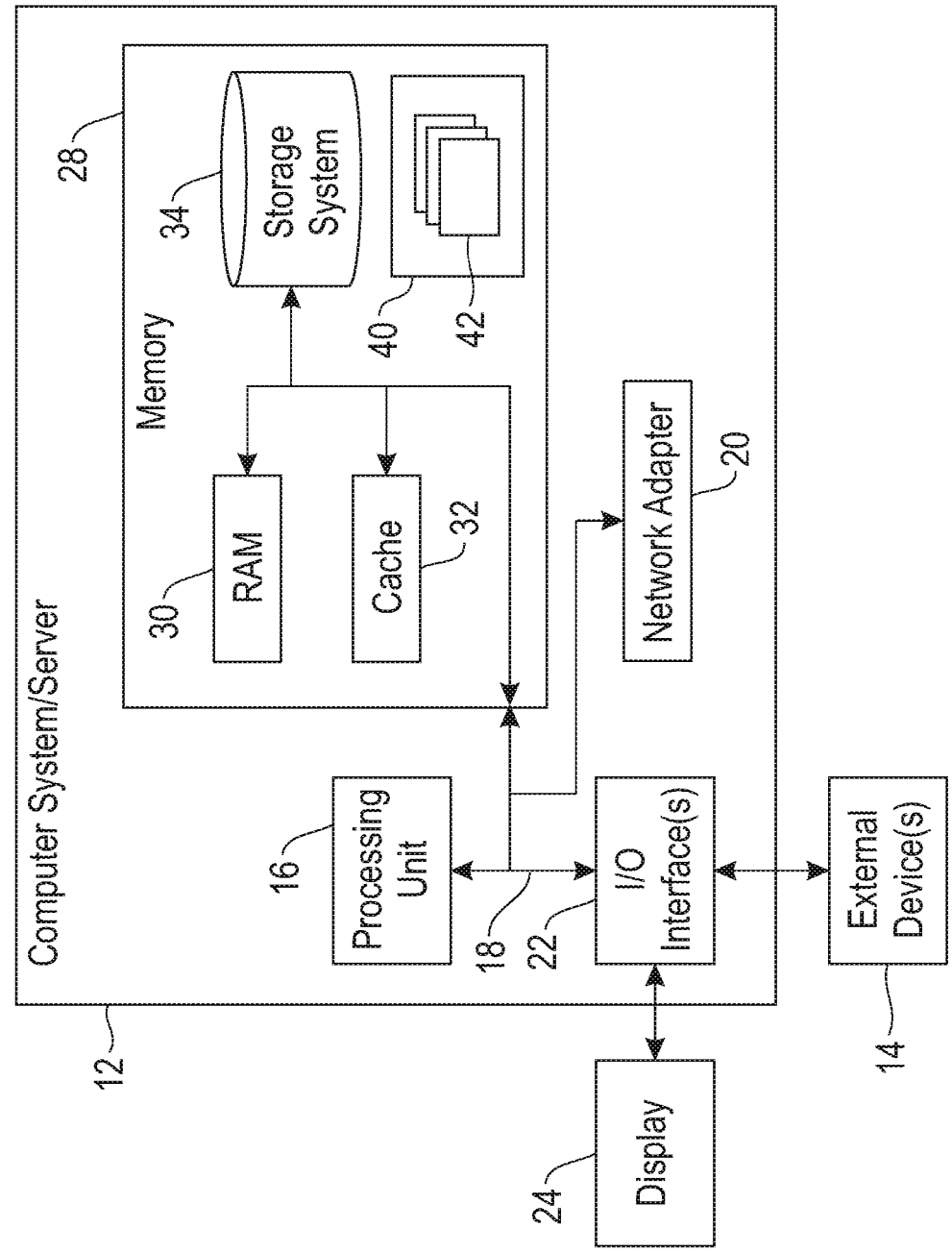
FIG. 1 is a block diagram depicting an exemplary cloud computing node according to an embodiment of the present invention.

Big Data is a collection of tools, techniques, and operations used for data sets that becomes so voluminous and complex that traditional data processing applications are inadequate to store, query, analyze or process the data sets using current database management and data warehousing tools or traditional data processing applications. For example, image analysis is an important type of big data analytics. Such analysis may include medical image analysis (e.g., anatomy segmentation, computer aided diagnosis), general three-dimensional ("3D") image analysis (e.g., surveillance video analysis) and two-dimensional ("2D") image analysis (e.g., scene reconstruction, event detection, object recognition). Imagine analysis may involve a computing system having characteristics such as, for example: central processing unit ("CPU") and memory intensive, a large number of images being processed at the same time, one or more long-running jobs (e.g., job exceeding a defined time period threshold), and/or one or more prohibitively expensive failures. Thus, a need exists from increasing computing efficiency and providing memory management operations needed to prevent performance degradation or costly job failures due to out-of-memory errors.

Accordingly, the present invention provides an orchestrated collection of operations based on safe upper bound estimation of job memory usage, thread compression and spilling. In one aspect, the present invention provides for managing memory for image analysis in a computing environment. An estimated amount of memory may be reserved for one or more image analysis jobs and partially suspending the one or more image analysis jobs upon memory requirements for the one or more image analysis jobs exceeding the estimated amount of memory. An upper bound of the estimated amount of memory may be estimated/predicted using a linear regression model with image resolution as an independent variable and a prediction interval. The linear regression model may be trained using a target function that penalizes under estimation of the estimated amount of memory as compared to over estimation.

In an additional aspect, the memory management may be performed in three main stages: 1) predict memory requirements and launch job with predicted amount, 2) if a job still exceeds memory capacity, the application may be compressed to ensure completion, and/or 3) if a job still exceeds memory capacity, one or more partitions may be spilled to ensure completion.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
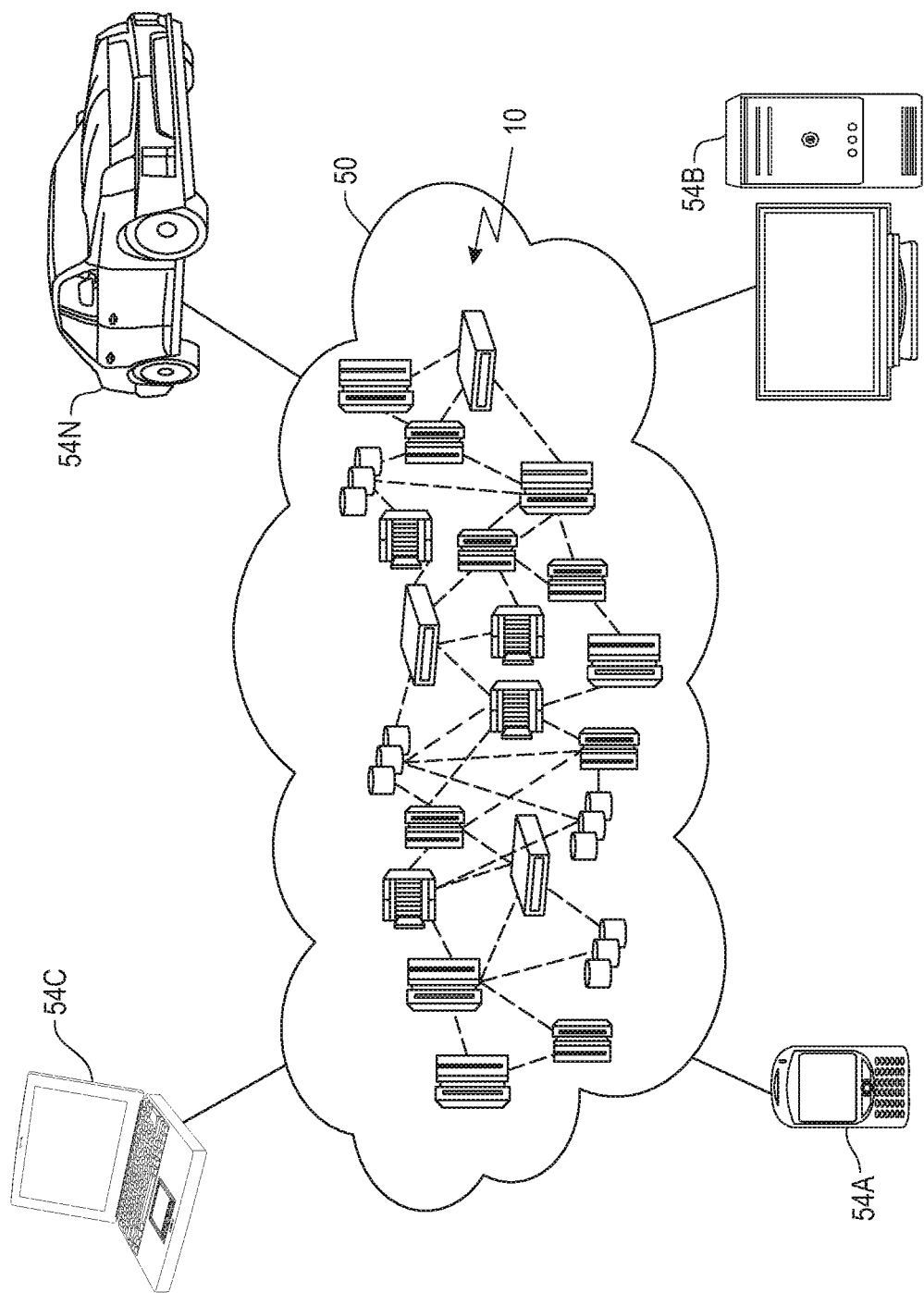
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
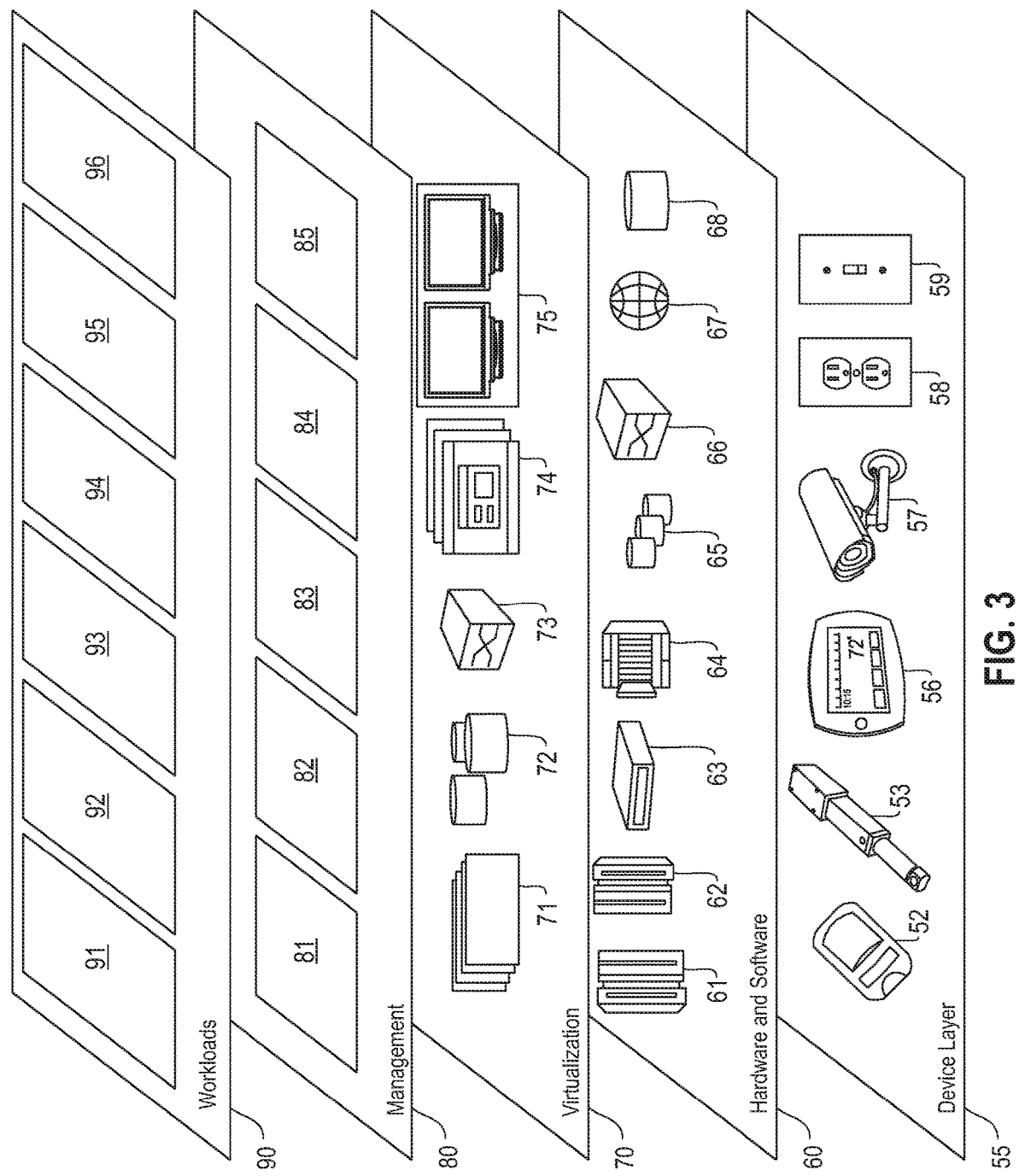
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing memory for complex image analysis in a computing environment. In addition, workloads and functions 96 for managing memory for complex image analysis in a computing environment may include such operations as data analytics, data analysis, and as will be further described, notification functionality. One with ordinary skill in the art will appreciate that the workloads and functions 96 for managing memory for complex image analysis in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for caching and data-aware placement for acceleration of machine learning applications involving deep learning models. That is, the present invention provides a data acceleration system coupling distributed storage caching with coordinated scheduling of data and training DL jobs. The distributed cache may be built on top of the memory and disks locally available on the compute nodes of a system. The distributed cache may be used to feed the GPUs with data providing near local storage I/O bandwidth. While deploying a DL distributed job, a number of nodes may be designated to cache the dataset from remote storage. Training jobs may be deployed preferably on those nodes. From the user perspective this reduces the training/inference time even if data is being sourced from a remote location. From the perspective of the service provider, this allows better utilization of resources as local storage is no longer considered as a strict requirement for the deployment of a job. This is in opposition to the current approach of dedicating a set of nodes to one training job even if not all the computing resources are being used. In addition, cached data can survive the execution of a training/inference and be reused by recurrent jobs (e.g., hyper-parameters tuning) or jobs that share a popular dataset, improving the utilization of the cluster network bandwidth.

As previously indicated, the present invention provides for managing memory for image analysis in a computing environment. An estimated amount of memory may be reserved for one or more image analysis jobs and partially suspending the one or more image analysis jobs upon memory requirements for the one or more image analysis jobs exceeding the estimated amount of memory. An upper bound of the estimated amount of memory may be estimated/predicted using a linear regression model with image resolution as an independent variable and a prediction interval. The linear regression model may be trained using a target function that penalizes under estimation of the estimated amount of memory as compared to over estimation.

In one aspect, memory reservation may be supported in parallel and/or distributed computing environment. A job scheduler may have means and/or parameters for specifying the memory required for a job. A job may only be submitted if there is enough memory (as compared to the memory requested) in the system at the time of submission, otherwise the job may be queued until there is enough memory. The amount of memory to be reserved may be predicted without actually running a job such as, for example, a job for image analysis.

Figure 4:
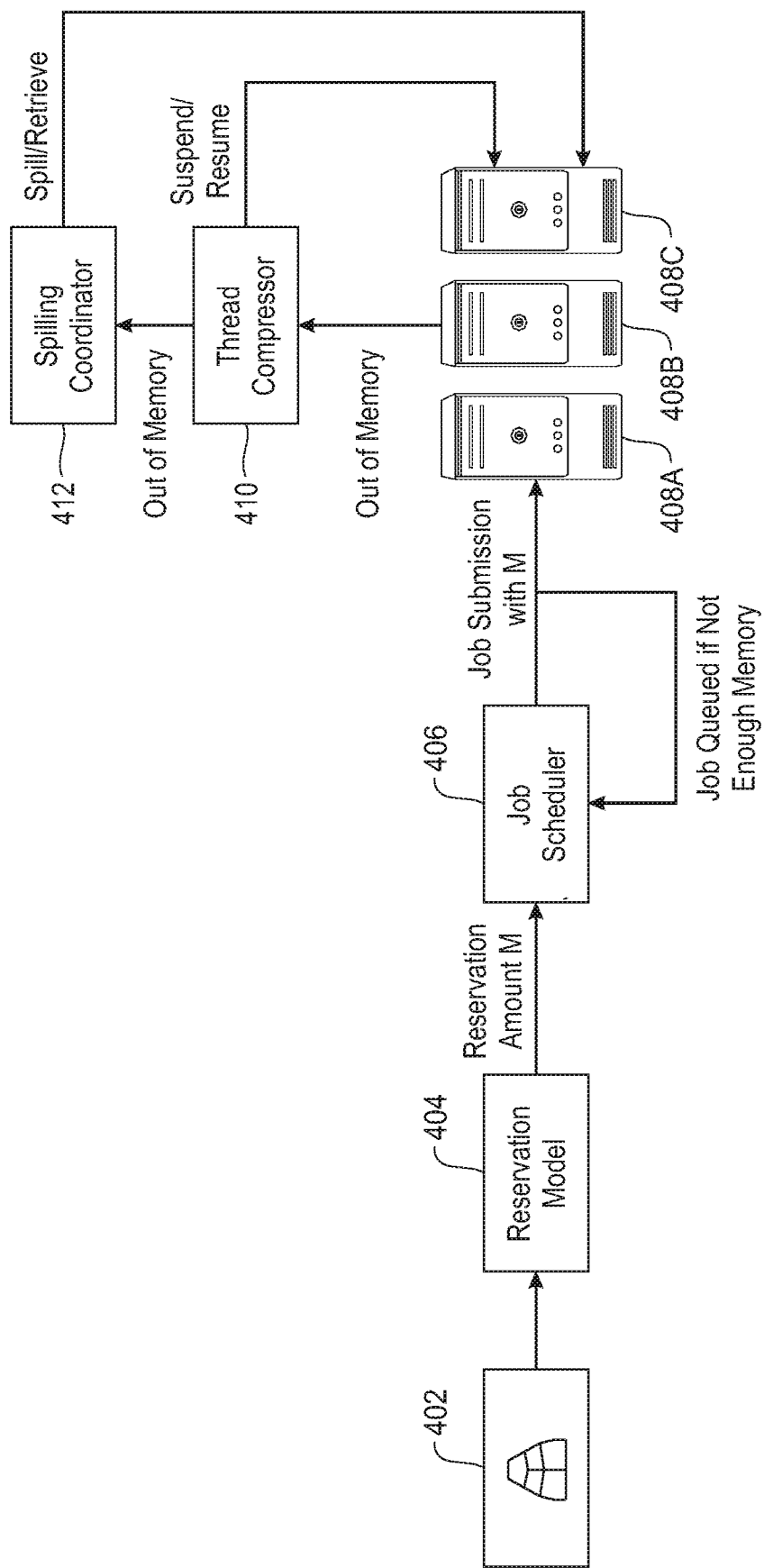
FIG. 4 is an additional block diagram depicting various user hardware and computing components functioning in accordance with aspects of the present invention.

Turning now to FIG. 4, a block diagram depicting exemplary functional components of a computing system 400 according to various mechanisms of the illustrated embodiments is shown. In one aspect, one or more of the components, modules, services, applications, and/or functions described in FIGS. 1-3 may be used in FIG. 4. As shown, the various blocks of functionality are depicted with arrows designating the blocks' relationship with each other of computing system 400 and to show process flow. Additionally, descriptive information is also seen relating each of the functional blocks of computing system 400. As will be seen, many of the functional blocks may also be considered "modules" of functionality, in the same descriptive sense as has been previously described in FIG. 4. With the foregoing in mind, the module blocks of computing system 400 may also be incorporated into various hardware and software components of a system for image enhancement in accordance with the present invention. Many of the functional blocks of computing system 400 may execute as background processes on various components, either in distributed computing components, or on the user device, or elsewhere.

Starting in block 404, an image 402 may be send to and/or received by a reservation model and the reservation model may reserve an amount of memory ("M"). That is, the reservation model may reserve an estimated amount of memory ("M") for one or more image analysis jobs and partially suspending the one or more image analysis jobs upon memory requirements for the one or more image analysis jobs exceeding the estimated amount of memory. In block 406, a job scheduler may schedule one or more image analysis jobs with the estimated amount of memory ("M") to memory 404A, 404B, and/or 404C. In one aspect, the one or more image analysis jobs may be queued at a time of job submission upon memory requirements for the one or more image analysis jobs exceeding the estimated amount of memory (e.g., job queued if insufficient memory).

A thread compressor may compress one or more threads to ensure completion of the one or more image analysis jobs upon the one or more image analysis jobs upon exceeding the estimated amount of memory (e.g., memory 404A, 404B, and/or 404C being out of memory), as in block 410. That is, the thread compressor may suspend and/or resume a thread according to defined memory state of the storage device/memory (e.g., memory 404A, 404B, and/or 404C). At block 412, a spill coordinator may spill and/or retrieve one more partitions of the one or more image analysis jobs to one or more storage devices (e.g., memory 404A, 404B, and/or 404C) to ensure completion of the one or more image analysis jobs upon the one or more image analysis jobs upon exceeding the estimated amount of memory.

Figure 5A:
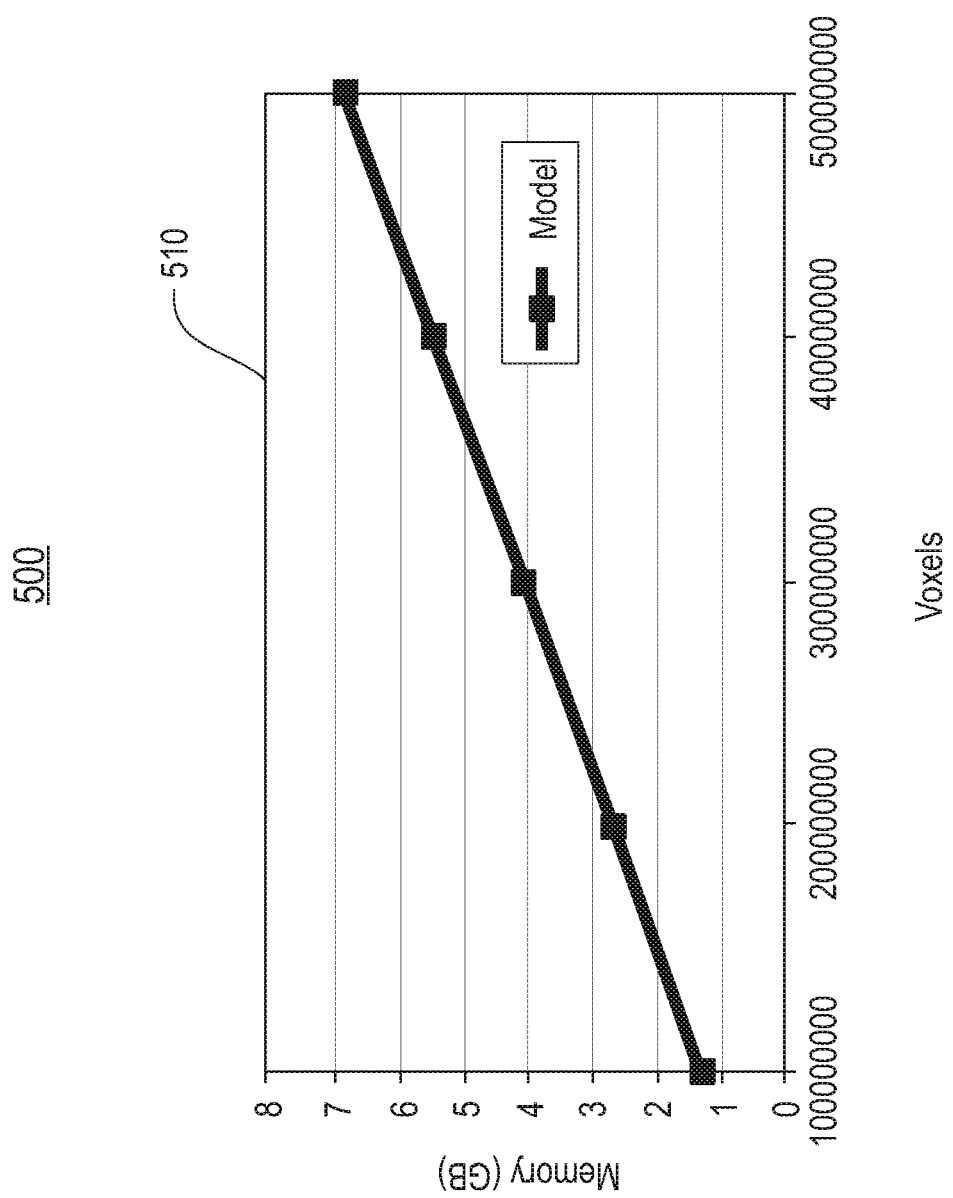
FIGS. 5A-5B are a diagram depicting managing memory for complex image analysis using a linear regression model in accordance with aspects of the present invention.
Figure 5B:
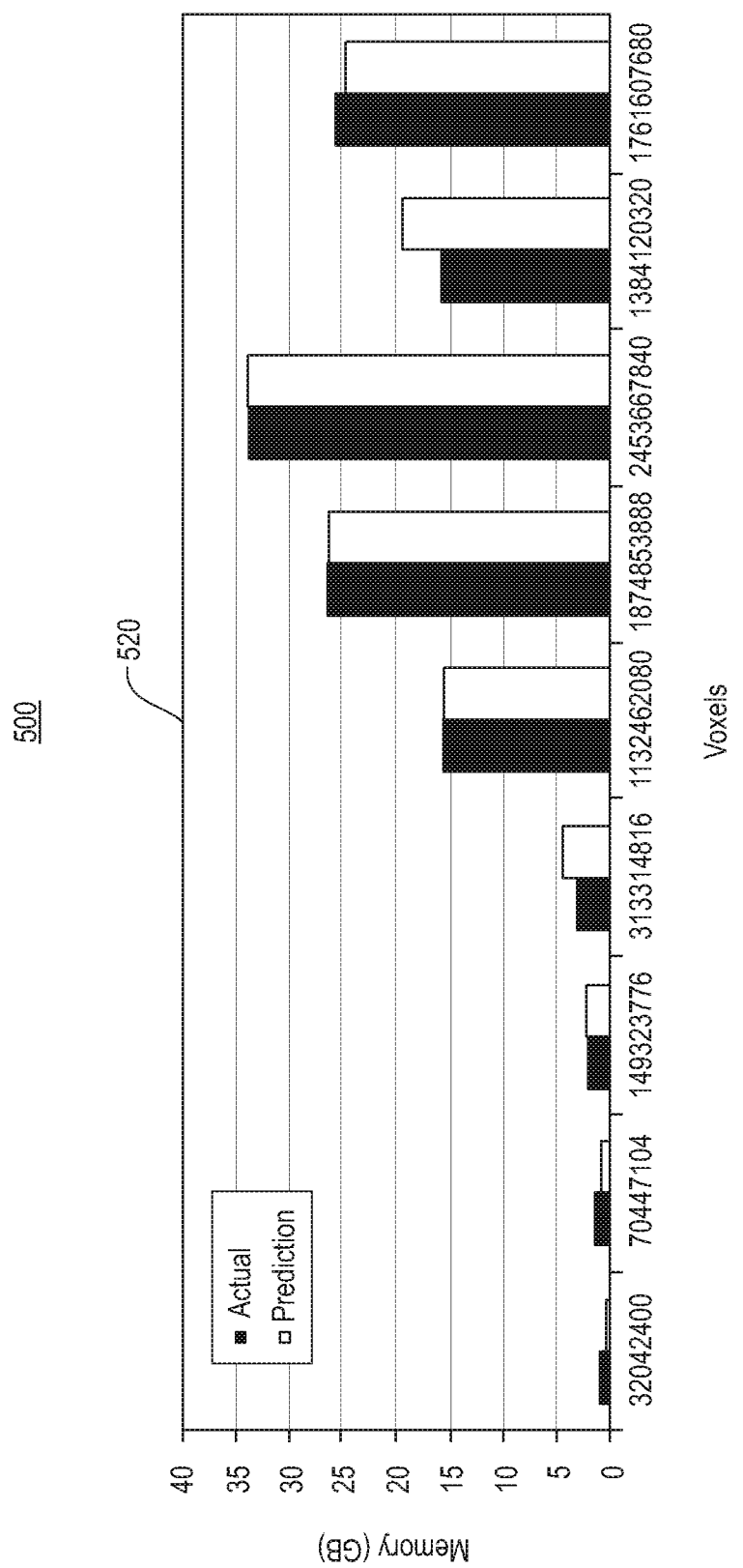

Turning now to FIG. 5A-5B, diagram 500 depicts managing memory for complex image analysis using a linear regression model. In one aspect, one or more of the components, modules, services, applications, and/or functions described in FIGS. 1-3 may apply and/or use the linear regression model of in FIG. 5A. In one aspect, a graph 510 of linear regression, using image resolution (e.g., pixels and/or voxels) as the dependent variable, may be used for approximation of memory (e.g., a gigabyte "GB" of memory). As illustrated in graph 510, using linear regression of the following equation:

$$y=f(x)=a*x+b \quad (1),$$

where a and b are computed using training data (xi, yi) '... (xn, yn to minimize target function sum $(F(xi)-yi)^2$, as illustrated in graph 520 of FIG. 5B, where the data values are for illustration purpose only. In one aspect, the image size is not used (i.e., the number of bytes on disk) as different images may be using different encodings (e.g., byte, long, uncharacter, etc.), compressed and/or encrypted. In a pairwise image analysis such as for example, medical image registration involving two images of voxels s1, and s2, image resolution "s" may determined by the larger of the two images, as illustrated in the following equation:

$$s=\max(s1,s2) \quad (2),$$

However, a regression model may under predict ("underpredict") the amount of memory usage, which may cause job failures and/or performance degradation.

As depicted in graph 520, the target function in the reservation model penalizes both over-prediction and under-prediction: sum $(F(xi)-yi)^2$. To alleviate under reservation of memory from empirical observed data, the present invention may apply an energy function such as, for example, using the following equation:

$$E=\alpha \Sigma_{f(xi)<yi}[F(xi)-yi]^2(xi)+(1-\alpha)\Sigma_{f(xi)\geq yi}[F(xi)-yi]^2(xi) \quad (3),$$

Where $\{xi, y\}_{i=1}^{n}$ may be an observed sample, where xi is the image size and yi is used memory. The f(xi)=a*xi+b is a linear function for fitting the data where a and b are parameters that are to be fitted $0 \leq \alpha \leq 1$ is a parameter balancing the contributing from underfitting and overfitting. Selecting α closer to the value of 1 may penalize under fitting more appropriately (e.g., heavier penalization) provided α, a and b can be solved through a least squared fitting.

In one aspect, a statistical prediction confidence interval "p" (e.g., p=99%) of the linear model may be used to establish an upper bound for the memory. For an image of resolution $x_0$, the memory consumption upper bound is:

$$f(x_0)+T_{-crit}*SE \quad (3),$$

where SE is the standard error of the prediction given as follows:

$$S_{yx}\sqrt{1+\frac{1}{n}+\left(\frac{(x_0-\bar{x})^2}{SS_x}\right)}, \quad (5),$$

Where $SS_x\Sigma(x_i-\bar{x})^2$ is the mean deviation of image sizes from the mean in the training set and the equation:

$$S_{yx}=\frac{\sqrt{\Sigma(yi-f(xi))^2}}{n}, \quad (6)$$

is the standard error of the estimate from the linear model. $T_{-crit}=T(p)$ is the student's t distribution value at p. The value of p can be set to a high value (e.g. 95%) to ensure actual memory usage is highly unlikely to exceed the upper bound or obtained through trial and error. It should also be noted that 1) the "student's t-distribution" (or simply the t-distribution) is any member of a family of continuous probability distributions that arises when estimating the mean of a normally distributed population in situations where the sample size is small and population standard deviation is unknown and 2) even a slight underestimation of few megabytes ("MB") of memory can lead to job failures. Thus, the present invention increases robustness against underestimation and handles of out-of-memory conditions by employing fallback mechanisms to guarantee job completion in case of memory underestimation by using 1) a thread memory-compressor, and 2) a spilling operation, as more clearly illustrated in FIGS. 6 and 7.

Figure 6:
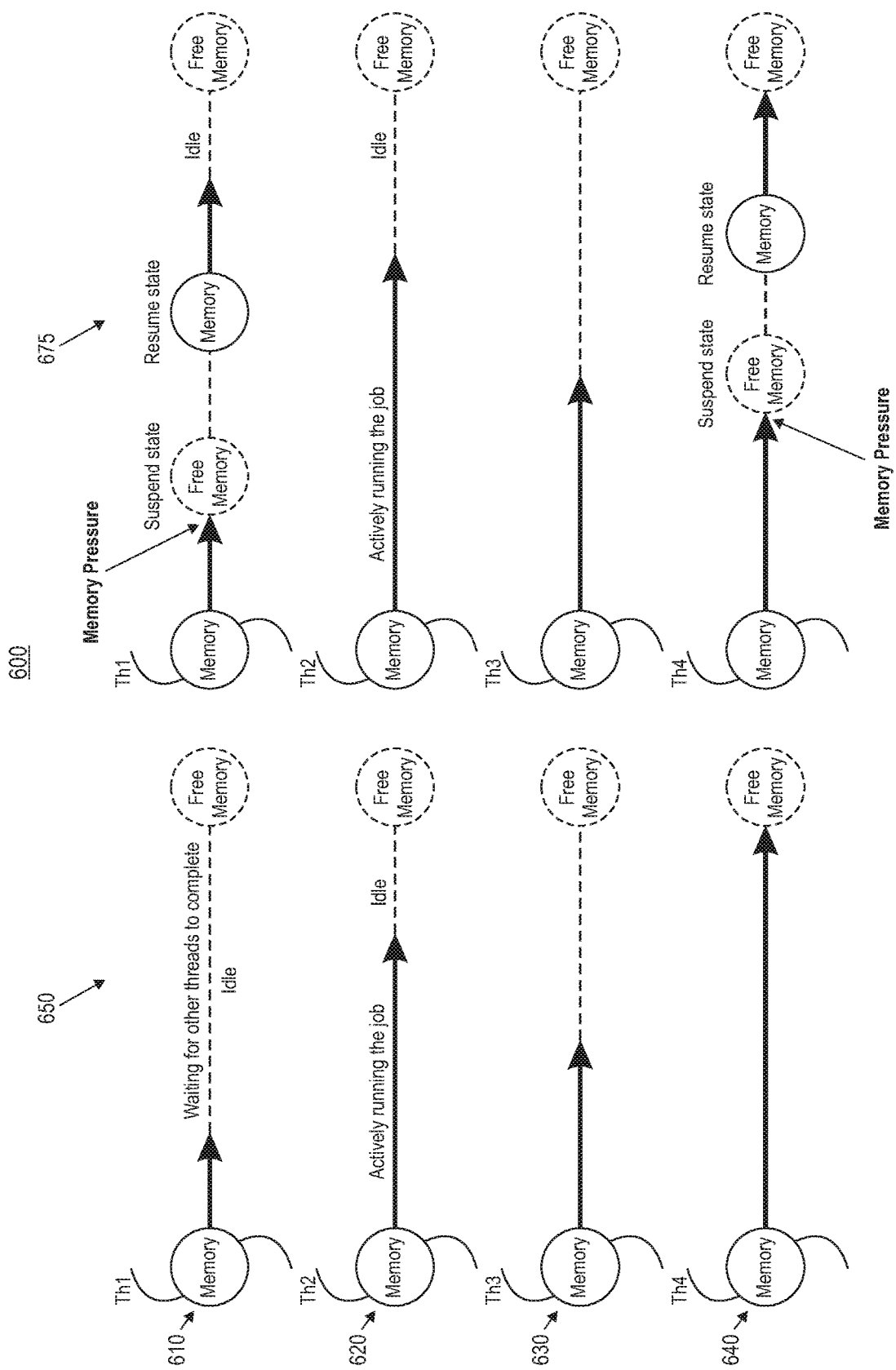
FIG. 6 is an additional block diagram depicting managing memory for complex image analysis according to a defined memory state in accordance with aspects of the present invention.

Turning now to FIG. 6, an additional block diagram 600 depicting managing memory for complex image analysis according to a defined memory state using a thread memory-compressor. In one aspect, one or more of the components, modules, services, applications, and/or functions described in FIGS. 1-4 may be used in FIG. 6. As illustrated in operations 650 and 675 of FIG. 6, an estimated amount of memory for one or more jobs (e.g., image analysis jobs) is depicted. Each image analysis job may include one or more threads of execution such as, for example, threads 610, 620, 630, and/or 640 as illustrated. In order for each job to complete, each thread (e.g., threads 610, 620, 630, and/or 640) is required to complete each of their respective unit of work and will wait for all the other threads to complete their units of work. For example, thread 610 waits for other threads such as, for example, threads 620, 630, and/or 640 to complete, and thread 620 is actively running the job and then becomes idle.

In operation 675, each of the memory states (e.g., additional memory states) may be managed such as, for example, a suspend state and a resume state at the thread level (e.g., threads 610, 620, 630, and/or 640) are added to each job's context of execution. In one aspect, an executing/running thread may be suspended (e.g., threads 610 and 640 by way of example only in operation 650) when encountering memory pressure to not require any further memory and allow other threads to complete. The suspended thread may be resumed e.g., threads 610 and 640 by way of example only in operation 650). In the model of FIG. 6, at least one thread per job will make progress thereby guaranteeing job progress and completion. A worst-case model will be such that each thread will execute one after another instead of running in parallel. This explains why the suspend-resume states may prolong the overall job completion time.

Thus, each job can now be controlled at a thread level using the proactive consumption of memory, thereby augmenting the job-scheduler's submit/queue model. In this way, the present invention reduces the total failure metrics without requiring expensive memory checkpoints to persistent storage media.

Said differently, the thread compressor suspends a thread, which means the thread is not requesting any more memory until the thread is resumed. In this way, the suspension of the thread (e.g., no longer requesting memory) helps and assists to allow other threads to finish when memory becomes scarce, but still avoid expensive checkpointing to persistent storage. If no memory is available, then a spilling component (e.g., spilling coordinator 414 of FIG. 4) may take care of checkpointing and thereby, actively freeing memory (and not just prevent threads from acquiring additional memory).

Figure 7:
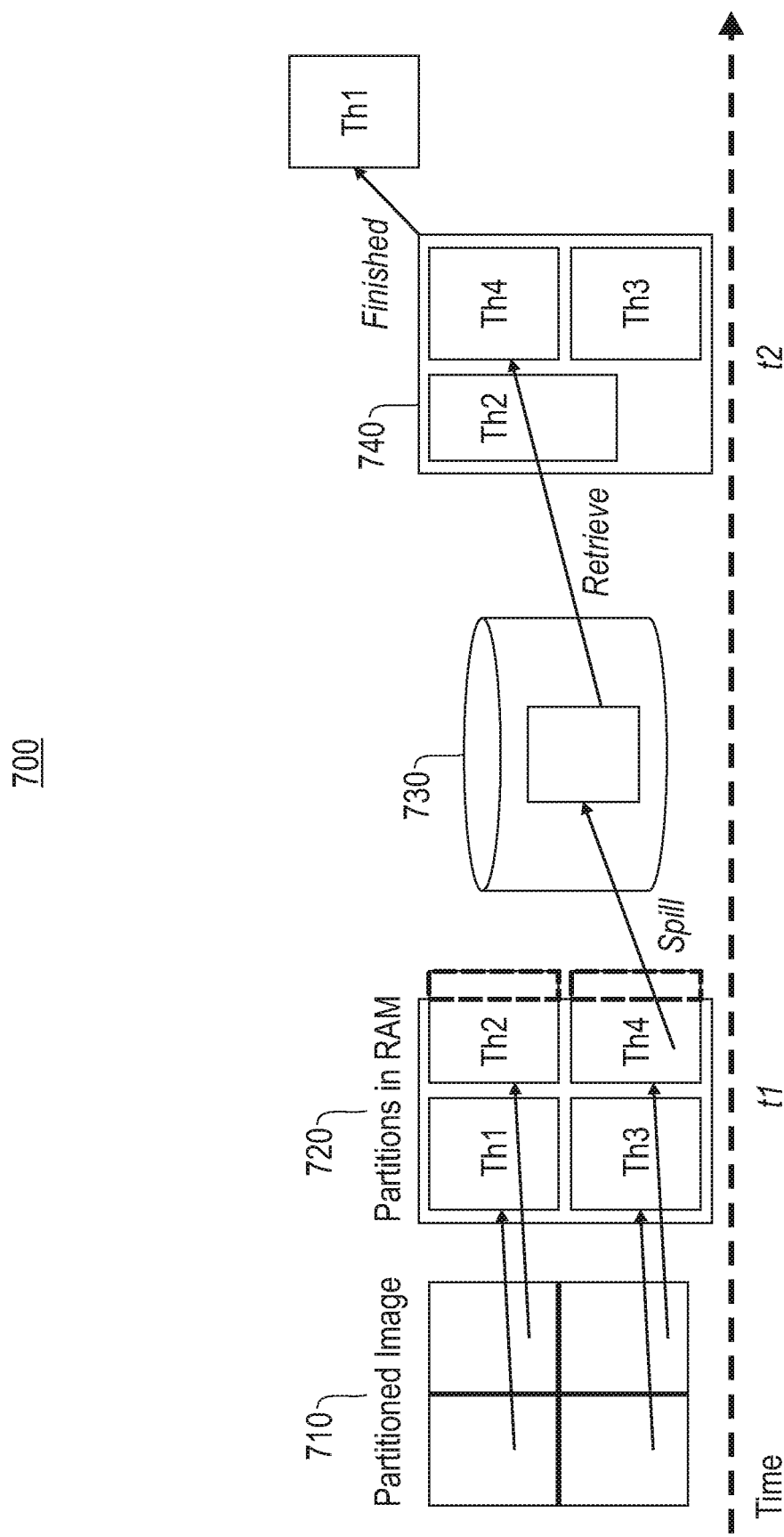
FIG. 7 is an additional block diagram depicting a spilling operation for managing memory for complex image analysis according to a defined memory state in accordance with aspects of the present invention.

FIG. 7 is an additional block diagram depicting a spilling operation for managing memory for complex image analysis according to a defined memory state. In one aspect, one or more of the components, modules, services, applications, and/or functions described in FIGS. 1-4 may be used in FIG. 7. As illustrated, FIG. 7 depicts a portioned image 710 having one or more threads (e.g., Th1, Th2, Th3, and Th4), which may use/require a selected amount of memory 720 (e.g., a random-access memory). If the total memory requirements of a job (that includes the one or more threads such as, for example, Th1, Th2, Th3, and Th4) exceed a total aggregated amount of memory in the cluster, the job may only finish by jointly operating on memory 720 and disk 730. Thus, one or more partitions/threads of the data may be spilled from memory 720 to disk 730 to free up memory. The threads (e.g., Th1, Th2, Th3, and Th4), may operate on partitions of image 710 in parallel and only share small state. One or more individual threads (e.g., Th1, Th2, Th3, and Th4) may be suspended and spill corresponding partition (e.g., Th4) to disk 730. The spilled partitions (e.g., Th4) may retrieved back to the disk 730 (e.g., memory) and resume computation on completion (e.g., Th1 is finished) of another thread when memory is freed.

Figure 8:
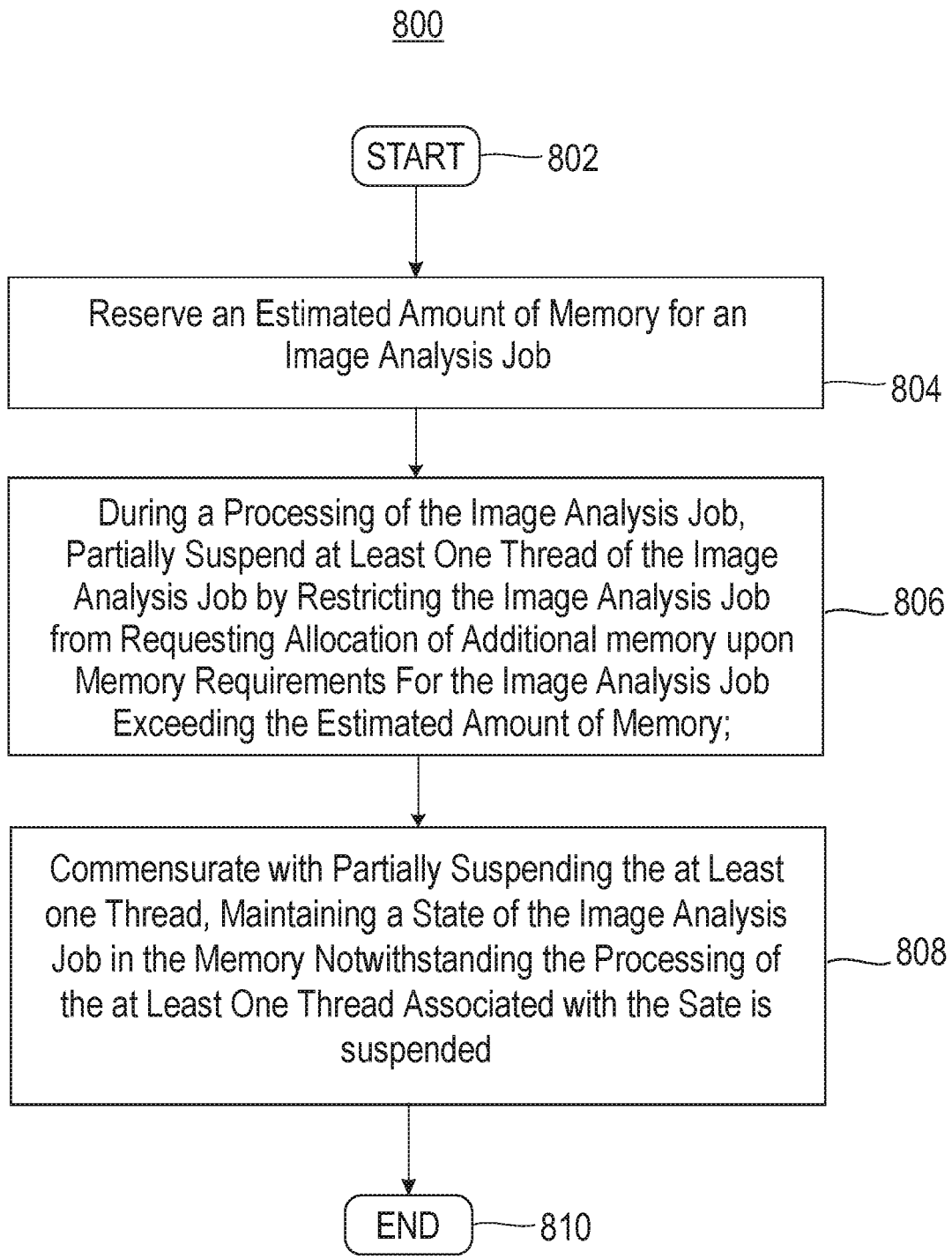
FIG. 8 is a flowchart diagram depicting an exemplary method for managing memory for complex image analysis in a computing environment, again in which various aspects of the present invention may be realized.

FIG. 8 is a flowchart diagram 800 depicting an additional exemplary method for managing memory for image analysis by a processor in a computing environment in which various aspects of the present invention may be realized. The functionality 800 may be implemented as a method executed as instructions on a machine, where the instructions are included on at least one computer readable medium or one non-transitory machine-readable storage medium. The functionality 800 may start in block 802.

An estimated amount of memory may be reserved for an image analysis job, as in block 804. During a processing of the image analysis job, at least one thread of the image analysis job is partially suspended by restricting the image analysis job from requesting allocation of additional memory upon memory requirements for the image analysis job exceeding the estimated amount of memory, as in block 806. Commensurate with partially suspending the at least one thread, a state of the image analysis job is maintained in the memory notwithstanding the processing of the at least one thread associated with the state is suspended, as in block 808. The functionality 800 may end, as in block 810.

Figure 9:
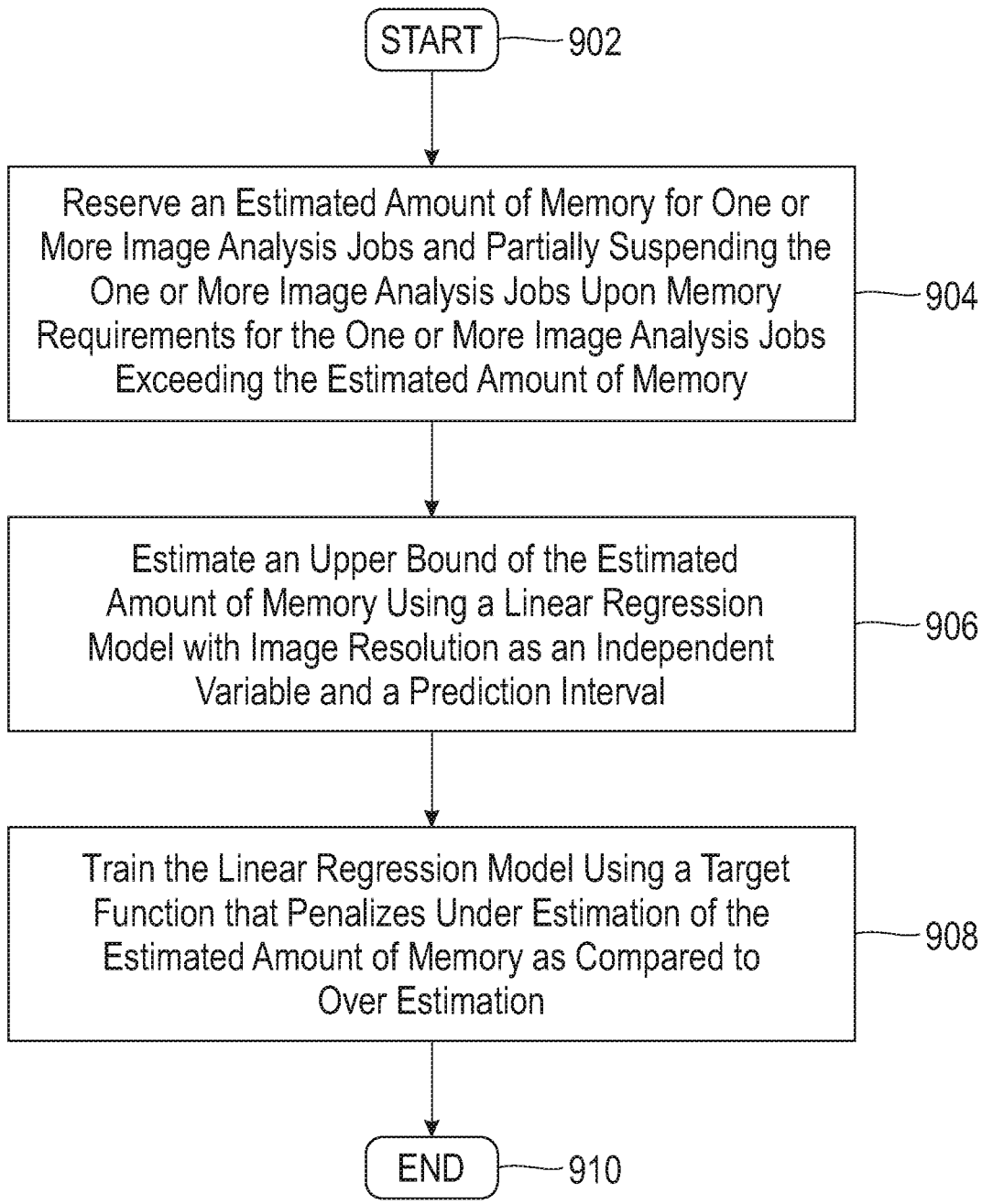
FIG. 9 is an additional flowchart diagram depicting an additional exemplary method for managing memory for complex image analysis in a computing environment, again in which various aspects of the present invention may be realized.

FIG. 9 is an additional flowchart diagram 900 depicting an additional exemplary method for managing memory for image analysis by a processor in a computing environment, again in which various aspects of the present invention may be realized. The functionality 900 may be implemented as a method executed as instructions on a machine, where the instructions are included on at least one computer readable medium or one non-transitory machine-readable storage medium. The functionality 900 may start in block 902.

An estimated amount of memory may be reserved for one or more image analysis jobs and partially suspending the one or more image analysis jobs upon memory requirements for the one or more image analysis jobs exceeding the estimated amount of memory, as in block 904. An upper bound of the estimated amount of memory may be estimated/predicted using a linear regression model with image resolution as an independent variable and a prediction interval, as in block 906. The linear regression model may be trained using a target function that penalizes under estimation of the estimated amount of memory as compared to over estimation, as in block 908. The functionality 900 may end, as in block 910.

In one aspect, in conjunction with and/or as part of at least one block of FIG. 8 or 9, the operations of methods 800 and/or 900 may include each of the following. The operations of methods 800 and/or 900 may estimate an upper bound of the estimated amount of memory using a linear regression model with image resolution as an independent variable and a prediction interval and train the linear regression model using a target function that penalizes under estimation of the estimated amount of memory as compared to over estimation.

The operations of methods 800 and/or 900 may compress one or more applications to ensure completion of the one or more image analysis jobs upon the one or more image analysis jobs upon exceeding the estimated amount of memory, queue the one or more image analysis jobs at a time of job submission upon memory requirements for the one or more image analysis jobs exceeding the estimated amount of memory, and/or suspend or resume one or more threads of the one or more image analysis jobs. The operations of methods 800 and/or 900 may spill one or more partitions of the one or more image analysis jobs to one or more storage devices to ensure completion of the one or more image analysis jobs upon the one or more image analysis jobs upon exceeding the estimated amount of memory, which may result in prolonging the job completion time, but guarantee job completion in case of memory underestimation, thereby increasing robustness and graceful handling of runtime out of memory situations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing memory for image analysis by a processor in computing environment, comprising:
    estimating an upper bound of an estimated amount of memory for an image analysis job using a linear regression model with image resolution as an independent variable and a prediction interval;
    reserving the estimated amount of memory for the image analysis job;
    during a processing of the image analysis job, partially suspending at least one thread of the image analysis job by restricting the image analysis job from requesting allocation of additional memory upon memory requirements for the image analysis job exceeding the estimated amount of memory; wherein commensurate with partially suspending the at least one thread, a state of the image analysis job is maintained in the memory notwithstanding the processing of the at least one thread associated with the state is suspended; and
    resuming the at least one thread of the image analysis job according to the state maintained in the memory.

2. The method of claim 1, further including training the linear regression model using a target function that penalizes under estimation of the estimated amount of memory as compared to over estimation.

3. The method of claim 1, further including compressing one or more applications to ensure completion of the image analysis job upon the image analysis job exceeding the estimated amount of memory.

4. The method of claim 1, further including queuing the image analysis job at a time of job submission upon memory requirements for the image analysis job exceeding the estimated amount of memory.

5. The method of claim 1, further including spilling one or more partitions of the image analysis job to one or more storage devices to ensure completion of the image analysis job upon the image analysis job exceeding the estimated amount of memory.

6. A system for managing memory for image analysis by a processor in a multi-tenant computing environment, comprising:
one or more computers with executable instructions that when executed cause the system to:
estimate an upper bound of an estimated amount of memory for an image analysis job using a linear regression model with image resolution as an independent variable and a prediction interval;
reserve the estimated amount of memory for the image analysis job;
during a processing of the image analysis job, partially suspend at least one thread of the image analysis job by restricting the image analysis job from requesting allocation of additional memory upon memory requirements for the image analysis job exceeding the estimated amount of memory; wherein commensurate with partially suspending the at least one thread, a state of the image analysis job is maintained in the memory notwithstanding the processing of the at least one thread associated with the state is suspended; and
resume the at least one thread of the image analysis job according to the state maintained in the memory.

7. The system of claim 6, wherein the executable instructions further train the linear regression model using a target function that penalizes under estimation of the estimated amount of memory as compared to over estimation.

8. The system of claim 6, wherein the executable instructions further compress one or more applications to ensure completion of the image analysis job upon the image analysis job exceeding the estimated amount of memory.

9. The system of claim 6, wherein the executable instructions further queue the image analysis job at a time of job submission upon memory requirements for the image analysis job exceeding the estimated amount of memory.

10. The system of claim 6, wherein the executable instructions further spill one or more partitions of the image analysis job to one or more storage devices to ensure completion of the image analysis job upon the image analysis job exceeding the estimated amount of memory.

11. A computer program product for managing memory for image analysis by a processor in a multi-tenant computing environment, the computer program product comprising a non-transitory computer-readable storage medium having computer-readable program code portions stored therein, the computer-readable program code portions comprising:
an executable portion that estimates an upper bound of an estimated amount of memory for an image analysis job using a linear regression model with image resolution as an independent variable and a prediction interval;
an executable portion that reserves the estimated amount of memory for the image analysis job;
an executable portion that, during a processing of the image analysis job, partially suspends at least one thread of the image analysis job by restricting the image analysis job from requesting allocation of additional memory upon memory requirements for the image analysis job exceeding the estimated amount of memory; wherein commensurate with partially suspending the at least one thread, a state of the image analysis job is maintained in the memory notwithstanding the processing of the at least one thread associated with the state is suspended; and
an executable portion that resumes the at least one thread of the image analysis job according to the state maintained in the memory.

12. The computer program product of claim 11, further including an executable portion that
trains the linear regression model using a target function that penalizes under estimation of the estimated amount of memory as compared to over estimation.

13. The computer program product of claim 11, further including an executable portion that compresses one or more applications to ensure completion of the image analysis job upon the image analysis job exceeding the estimated amount of memory.

14. The computer program product of claim 11, further including an executable portion that queues the image analysis job at a time of job submission upon memory requirements for the image analysis job exceeding the estimated amount of memory.

15. The computer program product of claim 11, further including an executable portion that spills one or more partitions of the image analysis job to one or more storage devices to ensure completion of the image analysis job upon the image analysis job exceeding the estimated amount of memory.

* * * * *